April 10, 1962  J. W. WIESMANN  3,028,966
DOMESTIC WATER DISTRIBUTION SYSTEM
Filed Nov. 4, 1957  7 Sheets-Sheet 2

FIG. 2

INVENTOR.
Joseph W. Wiesmann
BY Robert R. Churchill
ATTORNEY

April 10, 1962   J. W. WIESMANN   3,028,966
DOMESTIC WATER DISTRIBUTION SYSTEM
Filed Nov. 4, 1957   7 Sheets-Sheet 3

FIG. 3

INVENTOR.
Joseph W. Wiesmann

BY Robert R. Churchill

ATTORNEY

April 10, 1962    J. W. WIESMANN    3,028,966
DOMESTIC WATER DISTRIBUTION SYSTEM
Filed Nov. 4, 1957    7 Sheets-Sheet 4

FIG.4

INVENTOR.
Joseph W. Wiesmann
BY Robert R. Churchill

ATTORNEY

FIG.16

United States Patent Office 3,028,966
Patented Apr. 10, 1962

3,028,966
DOMESTIC WATER DISTRIBUTION SYSTEM
Joseph W. Wiesmann, Pittsburgh, Pa., assignor to H. H. Robertson Company, Pittsburgh, Pa., a corporation of Pennsylvania
Filed Nov. 4, 1957, Ser. No. 694,328
10 Claims. (Cl. 210—153)

This invention relates to a domestic water distribution system.

The invention has for an object to provide a novel and improved water distribution system embodying novel control apparatus and piping arrangements for the distribution of one or more types of water service to a plurality of service outlets which may be economically installed, easily maintained and repaired and which is highly convenient and efficient in use.

With this general object in view and such others as may hereinafter appear, the invention consists in the water distribution system and in the various components thereof hereinafter described and particularly defined in the claims at the end of this specification.

In the drawings illustrating the preferred embodiment of the invention.

In general the present invention contemplates a novel domestic water distribution system and the various components thereof adapted for the distribution of water to a plurality of service outlets or fixtures in a simple, efficient and economical manner and which is provided with novel control center apparatus for conveniently controlling the distribution and flow of water to the various individual service outlets. The present water distribution system is also particularly adapted for the distribution of a plurality of different types of water services, such as hard or raw water, soft or treated water, hot water, cold water, or super-hot water, which may be required in a domestic water distributing system and wherein each particular service is provided with a control center for controlling the distribution and pressure flow of the water to a plurality of individual outlets from each control center. In practice each control center may comprise a novel manifold provided with a main valve and a plurality of individual pipe lines to each service outlet, each pipe line having an individual valve control in the control center manifold for controlling the distribution and pressure flow to its respective outlet fixture.

The present domestic water distribution system further embodies a plurality of individual continuous tubing pipe lines running from the manifold to their respective outlet fixtures so that in practice the use of T's and L's and other conventional piping connections and fittings may be substantially eliminated. This results in a substantial reduction in the number of fittings and substantially reduces labor costs whereby the installation expense may be reduced to a minimum. A particular advantage in the present system resides in the structure wherein the control center manifold located in a convenient and accessible portion of the system provides a convenient central control for the entire system and for each individual pipe line of the system; thereby use of the conventional branch lines and individual intermediate control valves for each branch line which are usually widely separated from one another and poorly located for convenient access thereto are eliminated.

Figure 1:
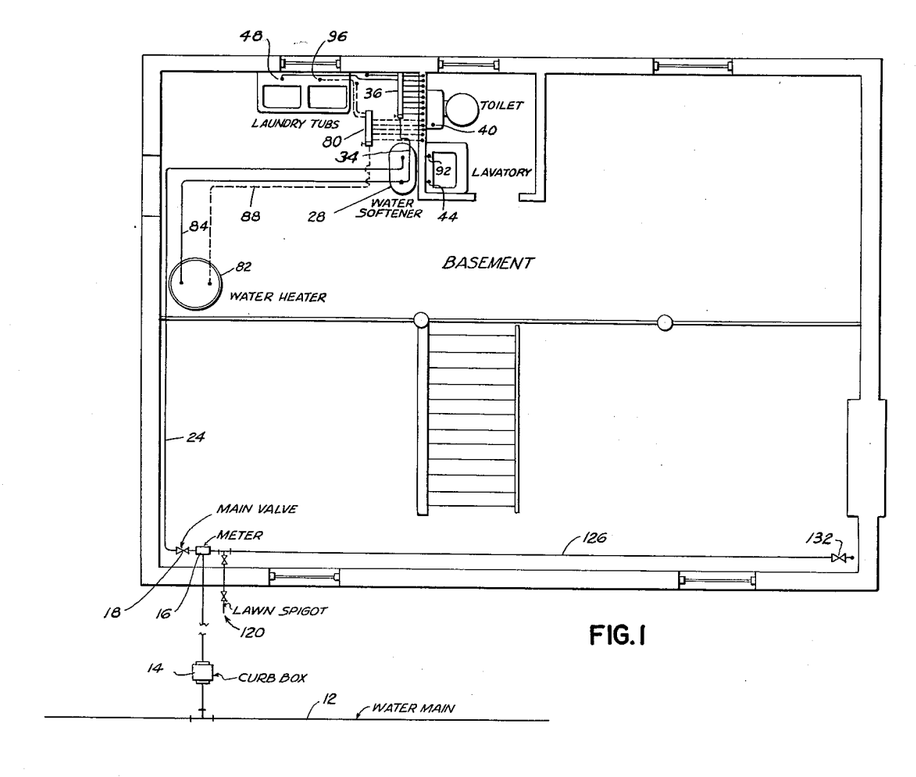
FIG. 1 is a plan view of the basement of a typical house provided with the present domestic water distribution system.
Figure 2:
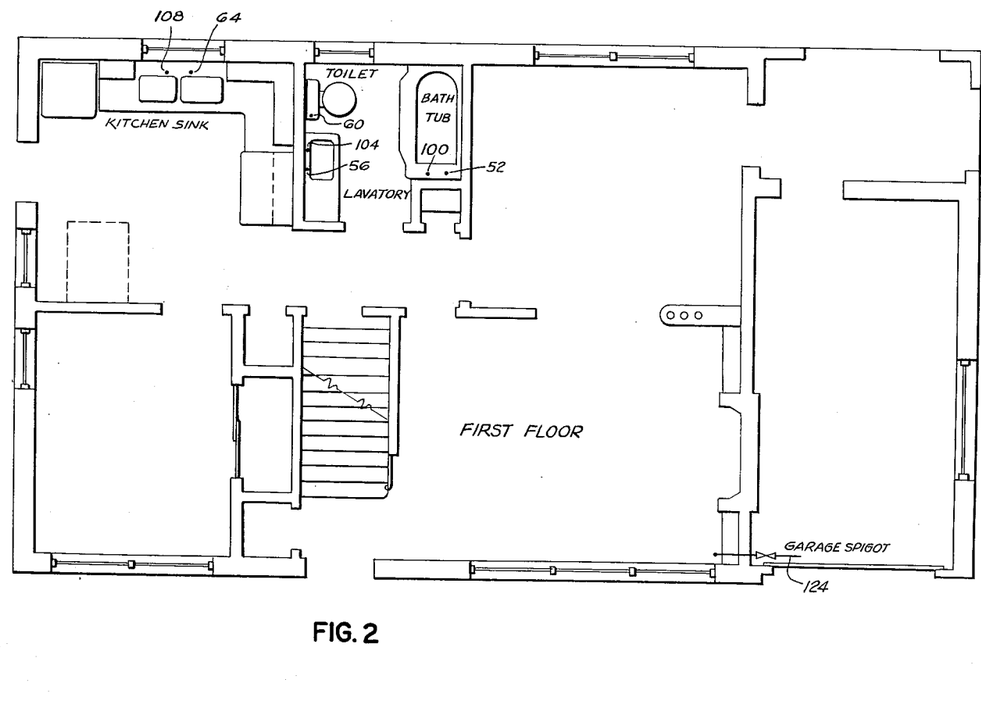
FIGS. 2 and 3 are similar views of the first and second floors respectively of the house shown in FIG. 1.
Figure 3:
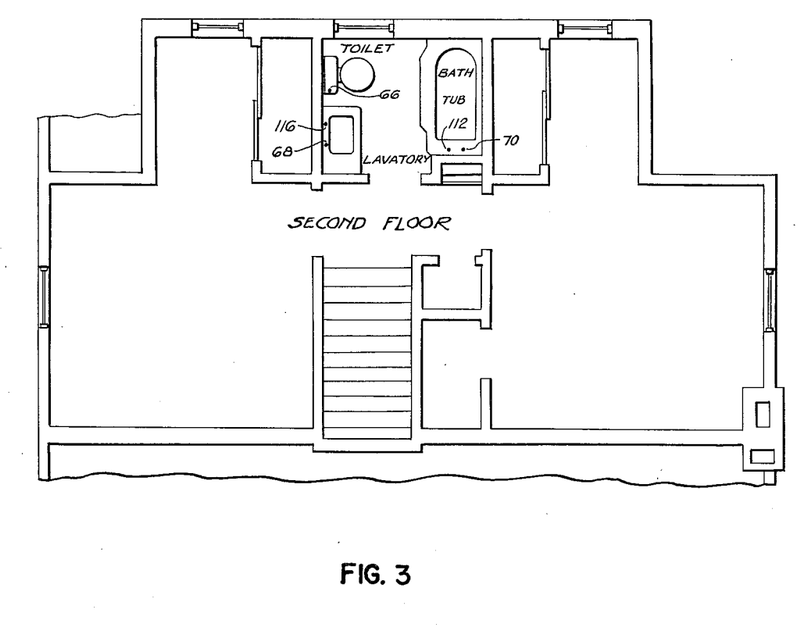
Figure 4:
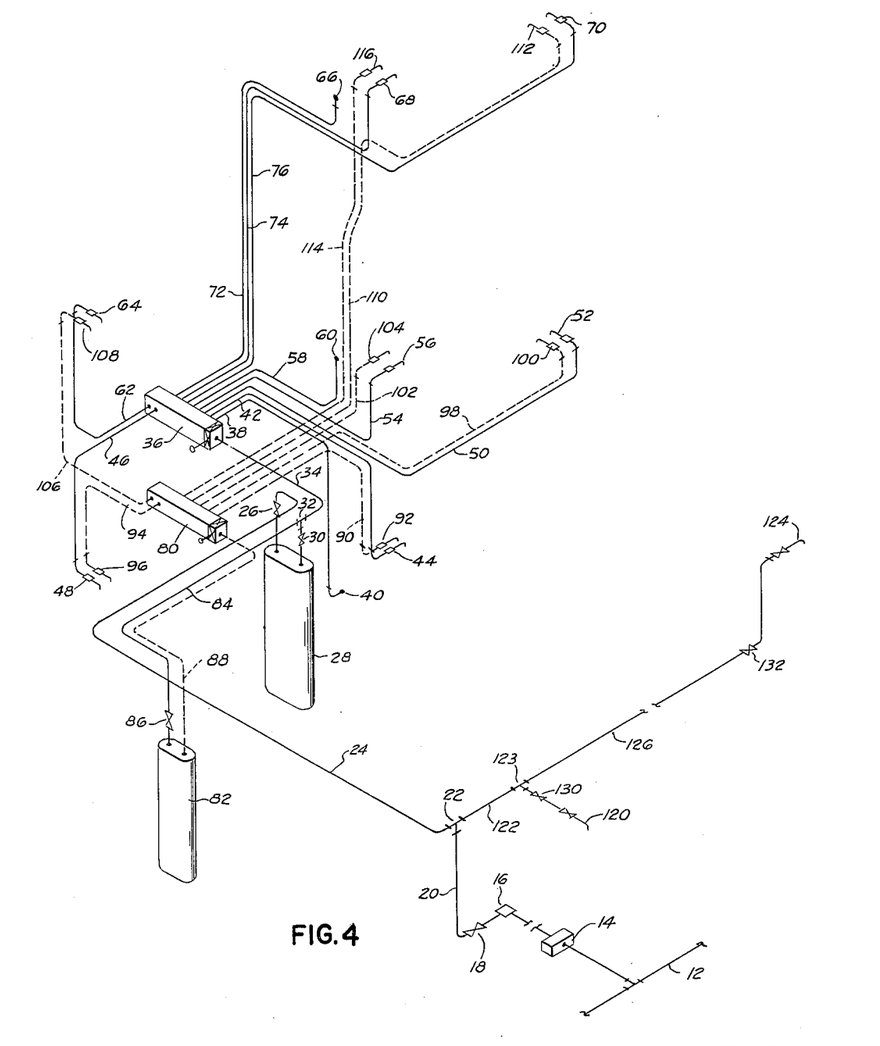
FIG. 4 is an isometric view of the present system showing the control units and piping servicing the outlets shown in FIGS. 1, 2 and 3.

Referring now to the drawings and particularly to FIGS. 1–4, the present domestic water distribution system is illustrated as embodied in a typical two-story house having a basement, and wherein provision is made for supplying hot and cold water service to outlets located in the basement, first floor and second floor. As shown in FIGS. 1 and 4, the system is connected to the street water main 12 through a curb box 14, meter 16 and main valve 18. The main valve 18 is connected by a pipe 20, see FIG. 4, to a T 22, one side of the T being connected by a pipe comprising a continuous length of tubing 24 to an inlet valve 26 of a water softener tank 28. The outlet of the water softener tank is also provided with a valve 30 connected to a T 32, one side of the T 32 being connected by a pipe 34 to the inlet valve end of a cold water manifold 36 comprising the control center for all of the treated cold water supplied to the service outlets or fixtures in the house.

Figures 5, 6:
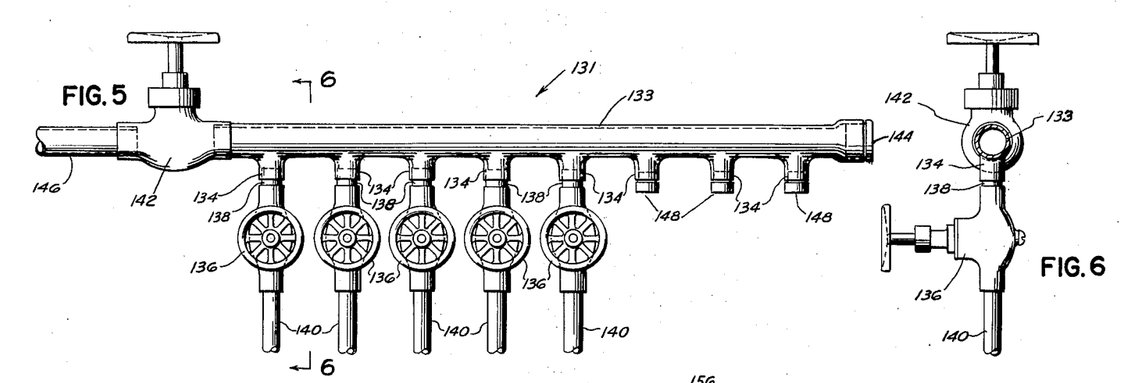
FIG. 5 is a side elevation of one form of central control unit comprising a manifold embodying individual control valves for each pipe line.
FIG. 6 is an end view of the same as seen in cross section from the line 6—6 of FIG. 5.
Figure 7:
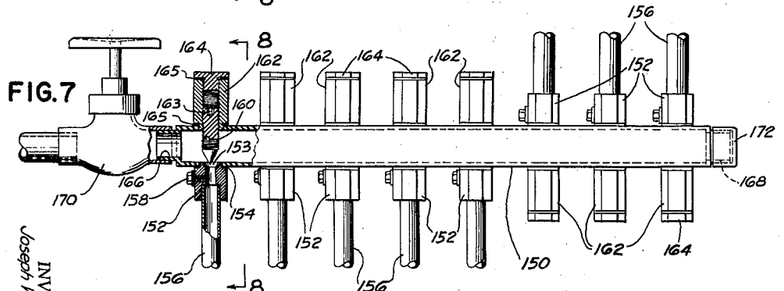
FIG. 7 is a view similar to FIG. 5 showing a modified form of central control unit embodying different control valves.

As illustrated in FIGS. 1 and 4, the cold water lines running from the manifold 36 to their respective service outlets are represented by full lines, herein shown as ten in number, eight lines being extended from one side of the manifold and two lines being extended from the other side of the manifold, each line comprising a continuous length of tubing from the manifold to its respective service outlet, and each line having an individual control valve at the manifold which may be of the type illustrated in detail in FIGS. 5 and 7. One line 38 from the cold water manifold 36 shown in FIG. 4 leads to the basement toilet outlet indicated at 40, an adjacent line 42 running to the basement lavatory service outlet indicated at 44. Another basement line 46 extending from the other side of the manifold runs to the cold water service outlet 48 for the laundry tubs to complete the cold water service outlets for the basement.

The cold water service outlets for the first floor shown in FIGS. 2 and 4 include the kitchen sink, toilet, lavatory, and bathtub. Pipe line 50 from the manifold 36 supplies cold water to the bathtub outlet fixture 52; pipe line 54 supplies cold water to the lavatory outlet fixture 56; and line 58 supplies cold water to the first floor toilet outlet fixture 60. A line 62 extending from the other side of the manifold runs to the cold water outlet fixture 64 for the kitchen sink to complete the cold water service outlets for the first floor.

The second floor service outlets for cold water shown in FIGS. 3 and 4 include the toilet outlet fixture 66, lavatory outlet fixture 68 and bathtub outlet fixture 70 supplied through continuous individual pipe lines 72, 74, 76 respectively running from the manifold to their respective service outlets.

The hot water lines of the present domestic water distribution system illustrated in FIGS. 1 to 4 are shown in dotted lines and are connected to a second manifold indicated generally at 80 which is supplied with hot water from a hot water heater 82. The inlet of the water heater is provided with treated cold water from the water softener tank 28 connected by a pipe line 84 extending from the other side of the T 32 and is provided with an inlet valve 86. The outlet from the hot water heater is connected by a pipe 88 to the inlet valve end of the hot water manifold 80. As shown in FIG. 4, there are seven hot water lines, five extended from one side of the manifold and two extended from the opposite side of the manifold. The hot water lines to the basement include the line 90 to the basement lavatory outlet fixture 92 and the line 94 to the laundry tub outlet fixture 96. The first floor hot water lines include a line 98 to the bathtub outlet fixture 100; line 102 to the lavatory outlet fixture 104; and line 106 to the kitchen sink outlet fixture 108. There are two lines supplying hot water to the second floor from the manifold 80, one line 110 leading to the bathtub outlet fixture 112 and one line 114 leading to the lavatory outlet fixture 116. It will be observed that all of the lines including the hot and cold water lines leading to the service outlets within the house are supplied with treated water which has passed through the water softener tank 28 before passing to their respective manifolds, and that each outlet fixture is supplied with water from the manifold by an individual continuous length of tubing substantially free of T's and L's and other connecting joints. As shown in FIG. 4, water supplied to the outside service outlets may comprise raw or untreated water directly connected to the source of water without passing through the water softener tank. The outside outlets shown include a lawn spigot 120 which is connected by a pipe 122 leading from the other side of the T 22 to a second T 123, and a garage spigot 124 connected by a pipe 126 leading from the opposite side of the second T. Each outside service pipe may be provided with an individual shutoff valve 130, 132 respectively as shown in FIG. 4.

Referring now to FIGS. 5 and 6, one form of central control unit may comprise a manifold indicated generally at 131 having a tubular cylindrical body portion 133 provided with a plurality of spaced openings defined by tubular extensions 134 from one side thereof, each opening having a valve 136 associated therewith and connected thereto by tubes 138, each valve controlling the flow of the water through the individual pipe lines 140 leading to their respective service outlets. One end of the tubular body portion is provided with a main valve 142, and the other end thereof is adapted to receive a plug or cap 144 as shown. In practice the supply pipe 146 to the main valve 142 may comprise three-quarter inch diameter tubing corresponding to the diameter of the body portion of the manifold, and the individual pipes 140 leading from the manifold may comprise ⅜ inch diameter tubing, for example, corresponding to the diameter of the openings 134. The individual valves 136 may comprise conventional ⅜ inch stopcocks provided with a drain. All of the tubes may be fitted into bores provided in their connecting fittings and soldered thereto so as to eliminate the use of threaded couplings or other joints. As shown in FIG. 5, some of the manifold openings 134, not presently in use, may be provided with plugs 148 which may be easily removed for future use.

Figure 8:
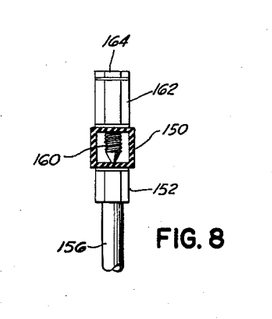
FIG. 8 is an end view of the same as seen in cross section from the line 8—8 of FIG. 7.

As illustrated in FIGS. 7 and 8, a preferred form of manifold which may be economically produced and which requires a minimum of space comprises a hollow rectangular body portion 150 having a plurality of threaded outlet openings on opposed sides thereof. The outlet openings on one side may each be provided with an adapter 152 threadedly engaged therewith and provided with a fiber sealing washer 154. The adapter 152 is provided with a bore at its outer end for receiving the individual length of tubing 156 leading to a single service fixture. Each adapter 152 may also be provided with a drain screw 158 in one side thereof as shown. The inner end of the adapter 152 is provided with a conical valve seat 153 arranged for co-operation with the conical end of a threaded valve member 160 carried by a second adapter 162 threadedly engaged with the threaded opening in the opposite side of the body portion 150. The top of the threaded valve member 160 may be provided with a hexagonal socket 163 to enable a suitable tool to be used to effect adjustment of the valve member 160 in the adapter 162 with respect to the seat 153 to control the flow of the water from the manifold into the tubing 156. The upper end of the threaded opening in the second adapter 162 may be provided with a plug 164. Fiber washers 165 may be provided between the inner end of the second adapter and the manifold and between the outer end of the second adapter and the plug 164 as shown. Each adapter may be hexagonal in cross section for convenience in applying a tool during assembly. Each end of the rectangular body portion 150 may be provided with an integral cylindrical tubular extension 166, 168. The extension 166 is connected to a shutoff valve 170 to which the main supply line is connected, and the extension 168 being provided with a cap 172 as shown. As illustrated in FIG. 7, the adapters 152, 162 are interchangeable to permit the direction of the extension of the individual tubes 156 to be reversed whenever required.

Figure 9:
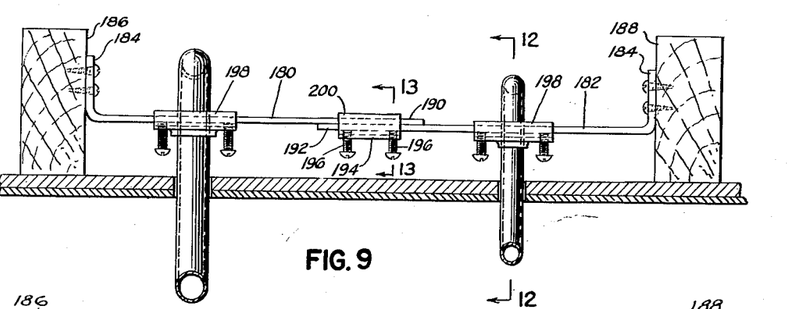
FIG. 9 is a plan view detail partly in cross section illustrating one type of mounting for supporting the piping in the wall of the house at a point adjacent an outlet.
Figure 10:
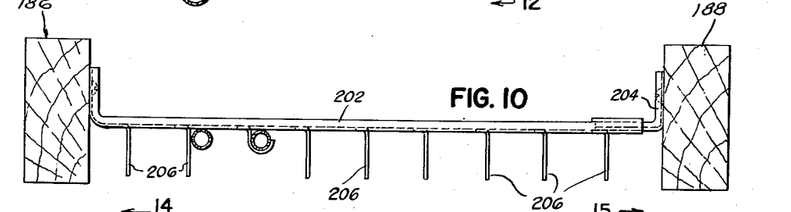
FIG. 10 is a plan view of a modified form of mounting for supporting the piping between the walls.
Figure 11:
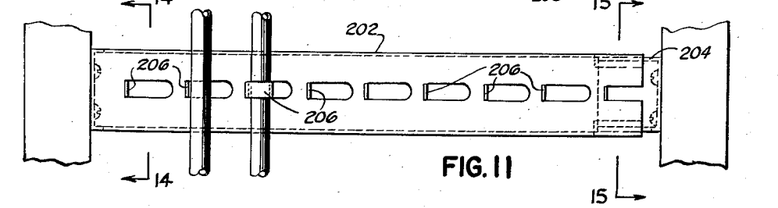
FIG. 11 is a front elevation of the same.
Figure 12:
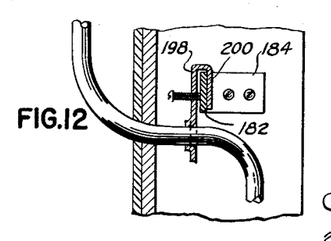
FIGS. 12 and 13 are cross sectional views taken on the lines 12—12 and 13—13 respectively of FIG. 9.
Figures 13, 14, 15:
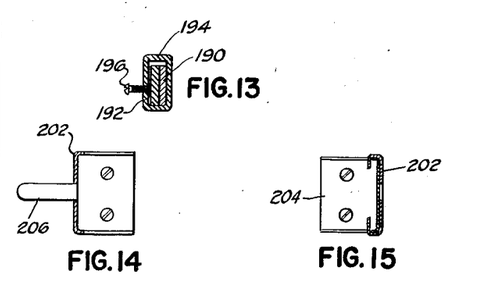
FIGS. 14 and 15 are vertical sections taken on the lines 14—14 and 15—15 respectively of FIG. 11.

FIGS. 9 to 15 illustrate constructional details designed to solve particular problems in the installation of the present water distribution system in a typical house. FIG. 9 illustrates a structure for supporting one or more pipes between the studs of a wall at the location wherein the pipes are extended through the wall. The disclosed structure includes two L-shaped bars 180, 182 connected by their shorter legs 184 to the sides of opposed studs 186, 188, the longer legs 190, 192 being arranged in overlapping relation and joined by a rectangular loop 194, as also shown in FIG. 13, the loop being provided with clamp screws 196 arranged to clamp together the overlapping free ends of the longer legs of the L-shaped bars and to permit the bars to be adjusted to fit between studs which may vary in spacing. The bars thus supported provide a support for the hanger brackets 198, each bracket having a reverse bend portion 200 at its upper end arranged to hook over the bar, and having an opening in its lower portion through which the tubing may be extended and led through an opening in the wall as shown in FIG. 12.

The constructional detail shown in FIGS. 10 and 11 comprises a similar structure including a pair of channel sectioned L-shaped sheet metal bars 202, 204 telescopically fitted together at their free ends and extended between and attached to the sides of the wall studs 186, 188. The bar 204 is relatively short, and the bar 202 is relatively long, the telescopic arrangement being provided to permit adjustment of the bars to fit the same between studs which may be spaced at varying distances from one another. The bar 202 is provided with a plurality of spaced punched-out bendable extensions or strips 206 which may be bent around the pipes extended upwardly between the walls for supporting the same therein.

Figure 16:
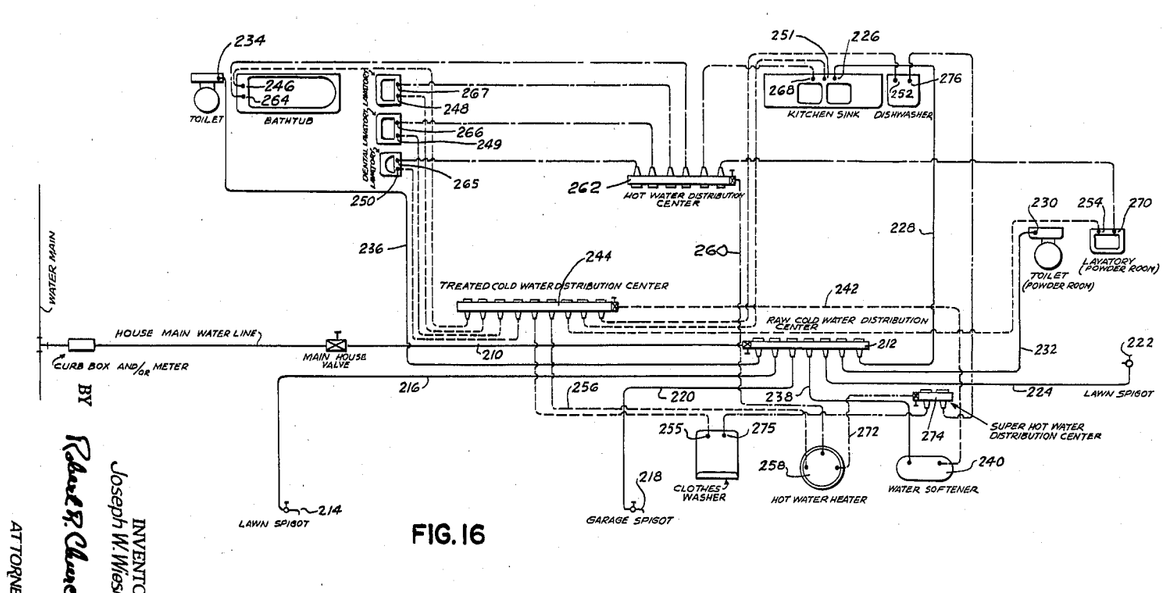
FIG. 16 is a diagrammatic plan view of a typical installation of the present water distribution in another type of house.

Referring now to FIG. 16, the present domestic water distribution system is therein shown as embodied in another typical house wherein a water distributing manifold control unit is provided for each of four different types of water. As herein shown, the supply from the street water main through a curb box and main house valve is connected by a pipe 210 to a raw cold water manifold 212. Raw water is distributed directly from the manifold 212 to the outside outlet fixtures including a lawn spigot 214 connected to the manifold by a continuous length of tubing 216; a garage spigot 218 connected to the manifold by a similar pipe 220; and a second lawn spigot 222 connected to the raw water manifold by a similar pipe 224. The raw water may also be distributed from the manifold 212 to a service outlet 226 in the kitchen sink by a pipe 228; to a toilet outlet 230 at one end of the house by a pipe 232; and to a second toilet outlet 234 at the other end of the house by a pipe 236. The remaining connection from the raw water manifold 212 includes a pipe 238 leading to the inlet of a water softener 240; the outlet from the water sofener being connected by a pipe 242, shown in dotted lines to indicate treated water, to the main valve end of a second manifold 244 for supplying treated cold water to the various service outlets through continuous pipes indicated by the dotted lines. The outlets include an outlet fixture 246 to a bathtub; outlet fixtures 248, 249, 250 to lavatories at one end of the house; outlet fixtures 251, 252 to the kitchen sink and dishwater respectively; and an outlet fixture 254 to a lavatory at the other end of the house. Another treated cold water line extends to an outlet fixture 255 in a clothes washer, and the remaining line 256 leads to the inlet of a hot water heater 258.

One outlet 260 from the hot water heater is shown in dot and dash lines and leads to a third manifold 262 for controlling the distribution of hot water to the various service outlets supplied by the pipe lines indicated in dot and dash lines. The hot water service outlets include an outlet fixture 264 to the bathtub; outlet fixtures 265, 266, 267 to the lavatories at one end of the house; an outlet fixture 268 to the kitchen sink; and an outlet fixture 270 to the lavatory at the other end of the house.

A second outlet from the hot water heater 258 is connected by a line 272, represented by double dot and dash lines, to a fourth manifold 274 for the distribution of super hot water. One of the service lines from the super hot water manifold 274 leads to an outlet fixture 275 in the clothes washer, and the other line leads to an outlet fixture 276 in the dishwasher.

From the foregoing description of the present water distribution system and of the various components thereof, it will be seen that the present system provides an economical, compact and convenient water distribution system for the various service outlets in a building wherein each pipe from the various novel control centers leading to an individual outlet is easily identifiable. It will also be seen that the present system may be easily and economically installed and requires a minimum of maintenance and that the various control centers may be conveninetly and accessibly located, thereby facilitating maintenance and repair of the system.

It will be apparent that the present system embodying novel control manifolds, herein described as employed in a water distributing system, may also be used with advantage for distributing fluids other than water.

While the preferred embodiment of the invention has been herein illustrated and described, it will be understood that the invention may be embodied in other forms within the scope of the following claims.

Having thus described the invention, what is claimed is:

1. In a domestic water distribution system having a single water inlet conduit for receiving pressurized water of one condition, plural water outlets, at least one water treating unit adapted to change the condition of water passing therethrough, first conduit means connecting said inlet conduit with said treating unit to provide water of a first condition, conduit means bypassing said treating unit to provide water of a second condition, a first selected group of said outlets receiving water of said first condition, a second selected group of said outlets receiving water of said second condition, each of said outlets having a valved outlet fixture associated therewith for regulating the discharge of water therefrom, the improvement comprising a control center including a first water manifold interposed between said treating unit and said first selected group of said outlets for receiving a supply of water of said first condition, a second water manifold interposed between said water inlet conduit and said second selected group of said outlets for receiving a supply of water of said second condition, each of said manifolds having a plurality of spaced manifold outlet openings, a plurality of individual lengths of piping free of branch lines, each of said individual lengths of piping connecting one of said manifold outlet openings with one said water outlet fixture remote from said control center, and individual valve means carried by each of said manifolds and cooperating with each of said manifold outlet openings.

2. In a domestic water distribution system having a single raw water inlet conduit, for receiving pressurized unheated water of one condition, plural water outlets, a water heater connected to said inlet conduit adapted to heat water passing therethrough to produce hot water, a water softener connected to said inlet conduit and adapted to demineralize water passing therethrough to produce soft water, a first selected group of said water outlets receiving said raw water, a second selected group of said water outlets receiving soft water and a third selected group of said outlets receiving hot water, each of said water outlets having a valved outlet fixture associated therewith for regulating the discharge of water therefrom, the improvement comprising a control center including a hot water manifold connected to said water heater and having connections with said third selected group of said outlets, a raw water manifold connected to said inlet conduit and having connections with said first selected group of said outlets, and a soft water manifold connected to said water softener and having connections with said second selected group of said outlets, each of said manifolds having a plurality of spaced manifold outlet openings, a plurality of individual lengths of piping free of branch lines serving as the said connections, each of said individual lengths of piping connecting one of said manifold outlet openings with one said water outlet fixture remote from said control center, and individual valve means carried by each of said manifolds and cooperating with each of said manifold outlet openings.

3. In a domestic water distribution system having a single raw water inlet conduit for receiving pressurized unheated water, plural water outlets, a water heater adapted to heat water passing therethrough to produce hot water, a water softener adapted to demineralize raw water passing therethrough to produce soft water, a first selected group of said water outlets receiving said raw unheated water, a second selected group of said water outlets receiving unheated soft water and a third selected group of said water outlets receiving hot, soft water, each of said water outlets having a valved outlet fixture associated therewith for regulating the discharge of water therefrom, the improvement comprising a control center including a raw water manifold, a soft water manifold and a hot, soft water manifold, said raw water manifold being connected to said inlet conduit and having connections with said first selected group of said outlets, conduit means extending from said raw water manifold to said water softener, conduit means extending from said water softener to said soft water manifold, conduit means extending from said soft water manifold to said water heater, conduit means extending from said water heater to said hot, soft water manifold, connections between said soft water manifold and said second selected group of said outlets, connections between said hot, soft water manifold and said third selected group of said outlets, each of said manifolds having a plurality of spaced manifold outlet openings, a plurality of individual lengths of piping free of branch lines serving as the said connections, each of said individual lengths of piping connecting one of said manifold openings with one said water outlet fixture remote from said control center, and individual valve means carried by each of said manifolds and cooperating with each of said manifold outlet openings.

4. A domestic water distribution system as defined in claim 1 wherein the control center manifold comprises an elongated hollow body portion having a main shutoff valve at one end and a plug at its other end.

5. A domestic water distribution system as defined in claim 1 wherein the control center manifold comprises an elongated tubular body portion having a main shutoff valve at one end and a plug at its other end, and wherein the outlet openings are defined by tubular extensions from the body portion connected to the individual valve means.

6. A domestic water distribution system as defined in claim 1 wherein the control center manifold comprises an elongated hollow body portion rectangular in cross section, and wherein the outlet openings are defined by threaded openings in one side wall of the rectangular body portion, each opening having an adapter threadedly secured therein and provided with a valve seat, said body portion having aligned threaded openings in the opposite side wall thereof, each opposed opening being provided with a second adapter threadedly secured therein, each of said second adapters being internally threaded and having a valve member adjustably engaged therein for cooperation with said seat.

7. A domestic water distribution system as defined in claim 6 wherein each first adapter is arranged to receive an outlet pipe, and wherein the outer end of each second adapter is provided with a threaded plug.

8. A domestic water distribution system as defined in claim 6 wherein the adapters are interchangeable to permit extension of the outlet pipes from either side of the manifold.

9. A domestic water distribution system as defined in claim 6 wherein the rectangular hollow body portion is provided with tubular extensions from each end, one end having a main shutoff valve connected thereto, the other end being plugged.

10. A domestic water distribution system as defined in claim 6 wherein each of said first adapters is provided with a drain.

References Cited in the file of this patent

UNITED STATES PATENTS

| | | |
|---|---|---|
| 904,987 | Pitner | Nov. 24, 1908 |
| 1,345,924 | Hager | July 6, 1920 |
| 1,472,265 | Bell | Oct. 30, 1923 |
| 1,598,858 | Greenawalt | Sept. 7, 1926 |
| 1,698,342 | McGill | Jan. 8, 1929 |
| 1,722,705 | Meyer | July 30, 1929 |
| 1,734,583 | Kersten | Nov. 5, 1929 |
| 1,834,387 | Dotterweich | Dec. 1, 1931 |
| 1,937,093 | Newell | Nov. 28, 1933 |
| 1,969,460 | Glenn | Aug. 7, 1934 |
| 2,233,050 | Groeniger | Feb. 25, 1941 |
| 2,287,633 | Newcum | June 23, 1942 |
| 2,295,888 | Bucknell et al. | Sept. 15, 1942 |
| 2,466,662 | Mindler | Apr. 5, 1949 |
| 2,816,726 | White | Dec. 17, 1957 |